US012750745B2

(12) United States Patent
Li et al.

(10) Patent No.: US 12,750,745 B2
(45) Date of Patent: Sep. 29, 2026

(54) RESELECTION BASED AT LEAST IN PART ON SUPPORT FOR A SERVICE

(71) Applicant: QUALCOMM Incorporated, San Diego, CA (US)

(72) Inventors: Chunxia Li, Beijing (CN); Feng Chen, Beijing (CN); Xiaochen Chen, Beijing (CN); Jintao Hou, Beijing (CN); Haizhou Liu, Beijing (CN); Zengyu Hao, Beijing (CN); Yi Qin, Beijing (CN); Hongjin Guo, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 561 days.

(21) Appl. No.: 17/906,314

(22) PCT Filed: May 13, 2020

(86) PCT No.: PCT/CN2020/090044
§ 371 (c)(1),
(2) Date: Sep. 14, 2022

(87) PCT Pub. No.: WO2021/226882
PCT Pub. Date: Nov. 18, 2021

(65) Prior Publication Data

US 2023/0095923 A1 Mar. 30, 2023

(51) Int. Cl.

| | |
|---|---|
| ***H04W 36/00*** | (2009.01) |
| ***H04W 48/20*** | (2009.01) |
| *H04W 4/40* | (2018.01) |

(52) U.S. Cl.
CPC ....... *H04W 36/0061* (2013.01); *H04W 48/20* (2013.01); *H04W 4/40* (2018.02)

(58) Field of Classification Search
CPC ... H04W 76/14; H04W 36/0072; H04W 4/40; H04W 36/08; H04W 4/70; H04W 92/18;
(Continued)

(56) References Cited

U.S. PATENT DOCUMENTS

| | | | |
|---|---|---|---|
| 10,542,547 | B2 | 1/2020 | Kubota et al. |
| 2013/0044668 | A1 | 2/2013 | Purnadi et al. |

(Continued)

FOREIGN PATENT DOCUMENTS

| | | | |
|---|---|---|---|
| CN | 108419277 | A | 8/2018 |
| CN | 110022191 | A | 7/2019 |

(Continued)

OTHER PUBLICATIONS

Supplementary European Search Report—EP20935037—Search Authority—Munich—Jan. 10, 2024.

(Continued)

*Primary Examiner* — Quoc Thai N Vu
(74) *Attorney, Agent, or Firm* — Harrity & Harrity LLP

(57) ABSTRACT

Various aspects of the present disclosure generally relate to wireless communication. In some aspects, a user equipment may receive an indication that identifies one or more neighbor cells, of a set of neighbor cells, that support a service; and perform a cell reselection process based at least in part on the indication that the one or more neighbor cells support the service. Numerous other aspects are provided.

30 Claims, 10 Drawing Sheets

(58) Field of Classification Search
CPC ......... H04W 36/0016; H04W 36/0061; H04W 4/44; H04W 4/46; H04W 48/10; H04W 48/12; H04W 72/02; H04W 16/14; H04W 36/14; H04W 36/24; H04W 48/20; H04W 48/18; H04L 67/104
See application file for complete search history.

(56) References Cited

U.S. PATENT DOCUMENTS

| | | | | |
|---|---|---|---|---|
| 2014/0161020 | A1 | 6/2014 | Jung et al. | |
| 2015/0215767 | A1* | 7/2015 | Siomina | H04W 8/02 455/435.2 |
| 2018/0206089 | A1* | 7/2018 | Cavalcanti | H04W 4/046 |
| 2020/0053835 | A1* | 2/2020 | Ye | H04L 1/08 |
| 2021/0377830 | A1* | 12/2021 | Jin | H04W 4/40 |
| 2022/0312291 | A1 | 9/2022 | Xu et al. | |
| 2022/0312299 | A1* | 9/2022 | Mochizuki | H04W 76/14 |

FOREIGN PATENT DOCUMENTS

| | | | |
|---|---|---|---|
| CN | 110536368 | A | 12/2019 |
| EP | 3849238 | A1 | 7/2021 |
| WO | 2016022009 | A1 | 2/2016 |
| WO | 2017039952 | | 3/2017 |
| WO | 2017046978 | A1 | 3/2017 |
| WO | 2018030776 | A1 | 2/2018 |
| WO | 2020047808 | A1 | 3/2020 |
| WO | 2021223204 | A1 | 11/2021 |

OTHER PUBLICATIONS

International Search Report and Written Opinion—PCT/CN2020/090044—ISA/EPO—Feb. 18, 2021.

Samsung: "Cell Re-Selection: Service Specific Frequency Prioritisation in NR", R2-1710104, 3GPP TSG-RAN WG2 #99bis, Prague, Czech Republic, Oct. 9-13, 2017, Oct. 13, 2017, 2 Pages, section 2.

* cited by examiner

RESELECTION BASED AT LEAST IN PART ON SUPPORT FOR A SERVICE

CROSS-REFERENCE TO RELATED APPLICATION

This application is a 371 national stage of PCT Application No. PCT/CN2020/090044 filed on May 13, 2020, entitled "RESELECTION BASED AT LEAST IN PART ON V2X SUPPORT," which is hereby expressly incorporated by reference herein.

FIELD OF THE DISCLOSURE

Aspects of the present disclosure generally relate to wireless communication and to techniques and apparatuses for reselection based at least in part on support for a service.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies.

SUMMARY

In some aspects, a method of wireless communication, performed by a user equipment, may include receiving an indication that identifies one or more neighbor cells, of a set of neighbor cells, that support a service (e.g., a vehicle to anything (V2X) service; and performing a cell reselection process based at least in part on the indication that the one or more neighbor cells support the service.

In some aspects, a method of wireless communication, performed by a base station, may include identifying one or more neighbor cells, of a set of neighbor cells, that support a service (e.g., a V2X service); and transmitting an indication that identifies the one or more neighbor cells that support the service.

In some aspects, a UE for wireless communication may include a memory and one or more processors operatively coupled to the memory. The memory and the one or more processors may be configured to receive an indication that identifies one or more neighbor cells, of a set of neighbor cells, that support a service; and perform a cell reselection process based at least in part on the indication that the one or more neighbor cells support the service.

In some aspects, a base station for wireless communication may include a memory and one or more processors operatively coupled to the memory. The memory and the one or more processors may be configured to identify one or more neighbor cells, of a set of neighbor cells, that support a service; and transmit an indication that identifies the one or more neighbor cells that support the service.

In some aspects, a non-transitory computer-readable medium may store one or more instructions for wireless communication. The one or more instructions, when executed by one or more processors of a UE, may cause the one or more processors to receive an indication that identifies one or more neighbor cells, of a set of neighbor cells, that support a service; and perform a cell reselection process based at least in part on the indication that the one or more neighbor cells support the service.

In some aspects, a non-transitory computer-readable medium may store one or more instructions for wireless communication. The one or more instructions, when executed by one or more processors of a base station, may cause the one or more processors to identify one or more neighbor cells, of a set of neighbor cells, that support a service; and transmit an indication that identifies the one or more neighbor cells that support the service.

In some aspects, an apparatus for wireless communication may include means for receiving an indication that identifies one or more neighbor cells, of a set of neighbor cells, that support a service; and means for performing a cell reselection process based at least in part on the indication that the one or more neighbor cells support the service.

In some aspects, an apparatus for wireless communication may include means for identifying one or more neighbor cells, of a set of neighbor cells, that support a service; and means for transmitting an indication that identifies the one or more neighbor cells that support the service.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
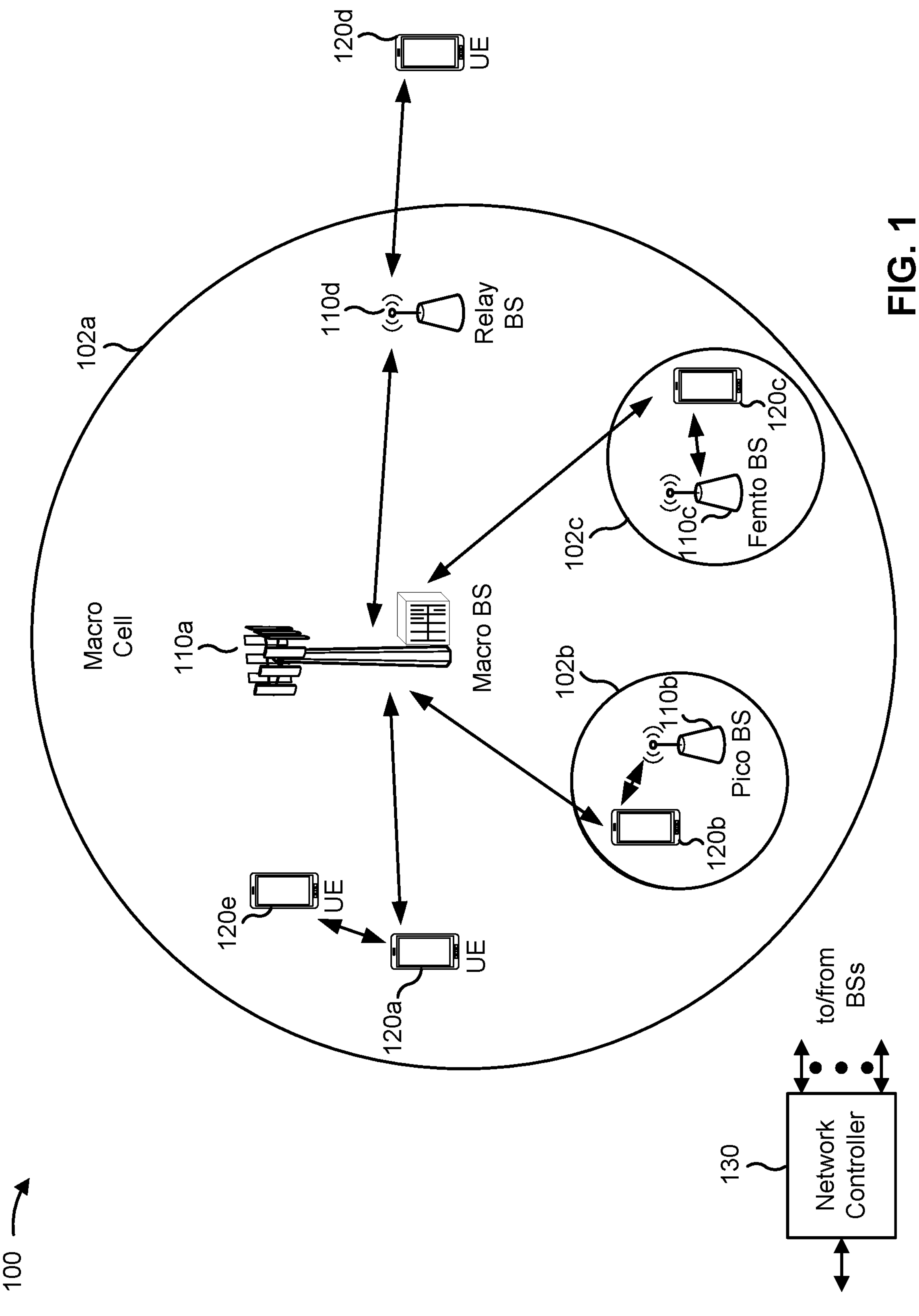
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
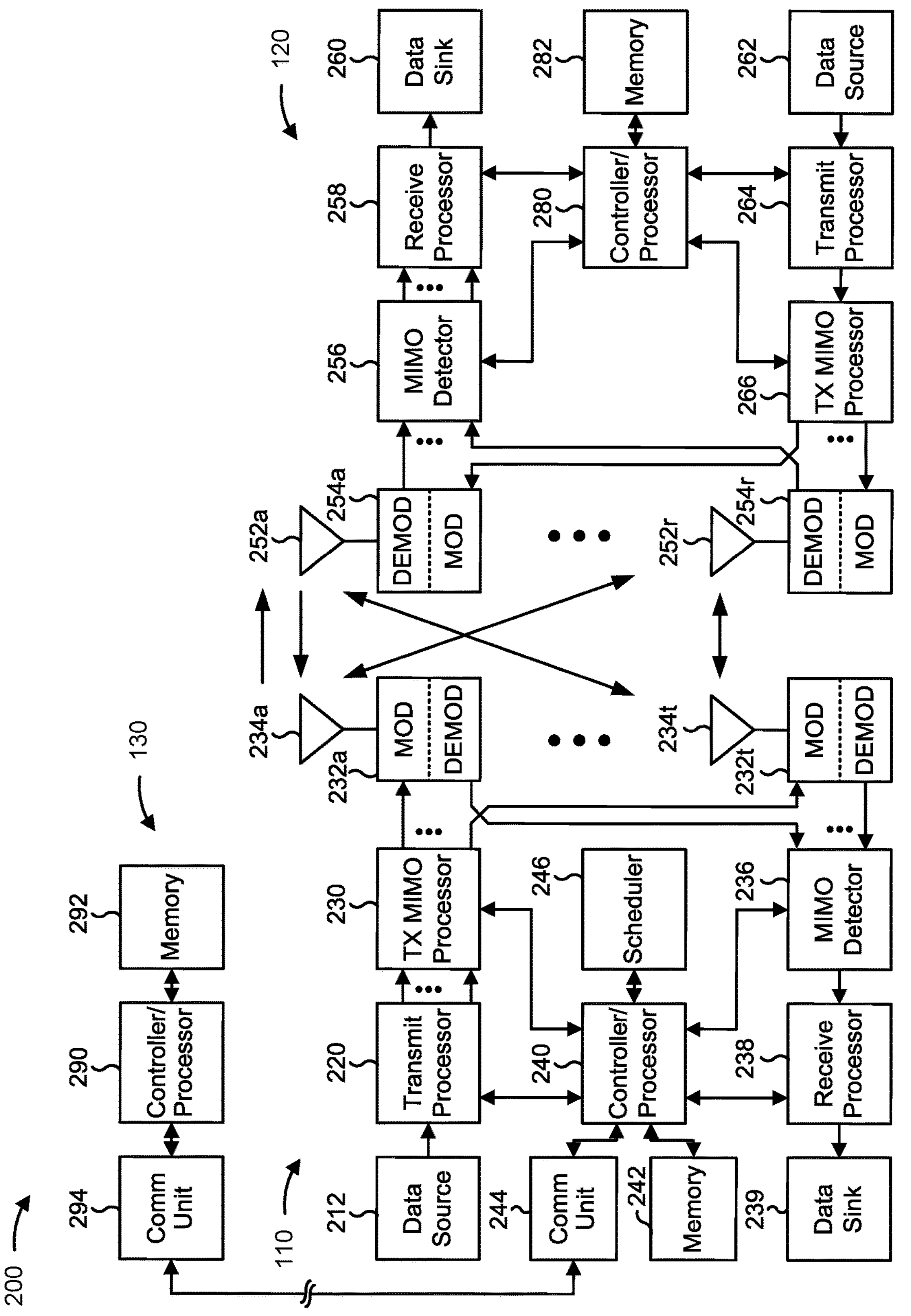
FIG. 2 is a diagram illustrating an example of a base station in communication with a UE in a wireless communication network, in accordance with various aspects of the present disclosure.

FIG. 2 is a diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with reselection based at least in part on vehicle-to-anything (V2X) support, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 500 of FIG. 5, process 600 of FIG. 6, and/or other processes as described herein. A scheduler 246 may schedule UEs for data transmission on the downlink and/or uplink.

In some aspects, UE 120 may include means for receiving an indication that identifies one or more neighbor cells, of a set of neighbor cells, that support a service (e.g., a V2X service); means for performing a cell reselection process based at least in part on the indication that the one or more neighbor cells support the service; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying one or more neighbor cells, of a set of neighbor cells, that support a service; means for transmitting an indication that identifies the one or more neighbor cells that support the service; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
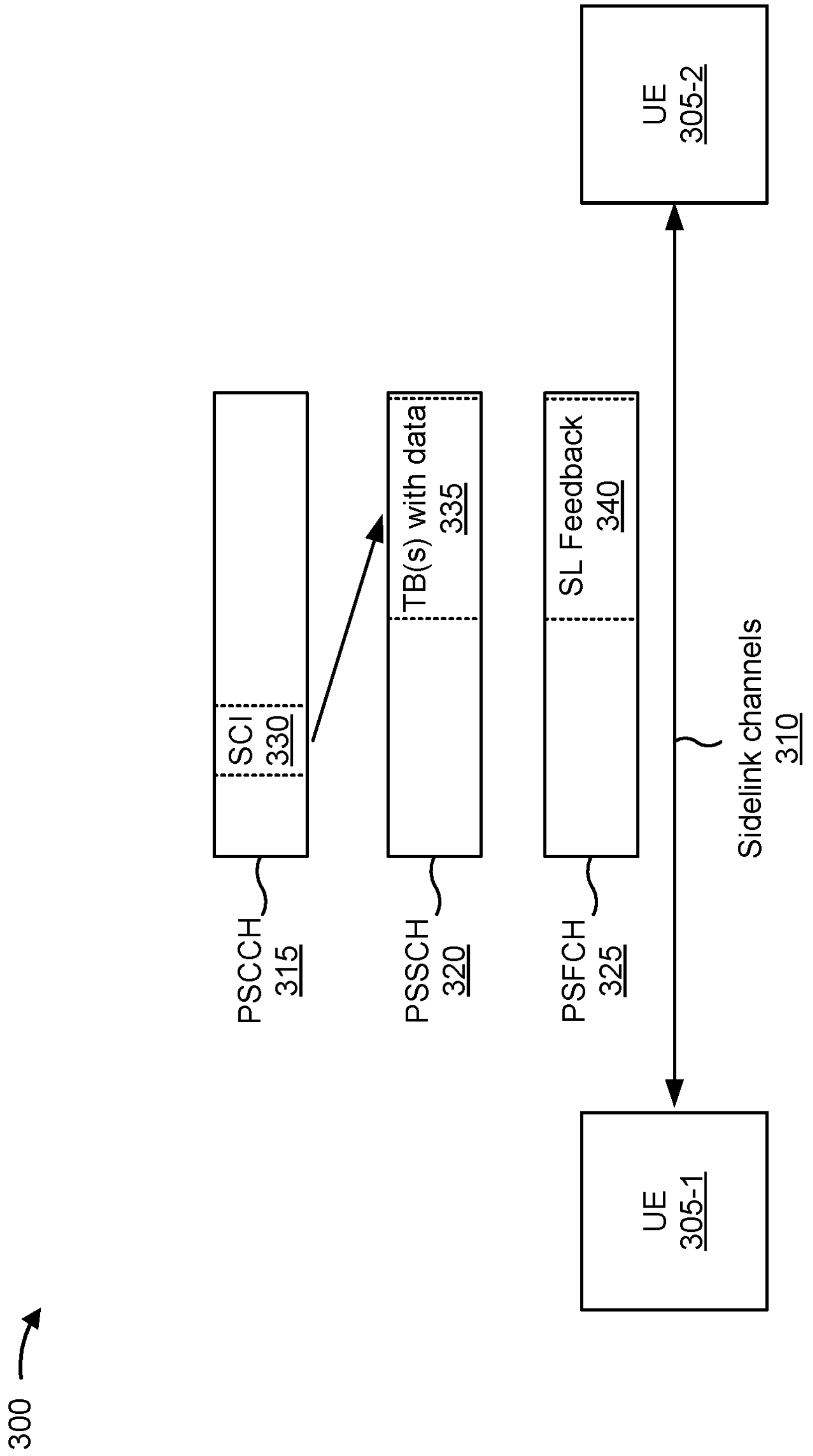
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, cellular V2X communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
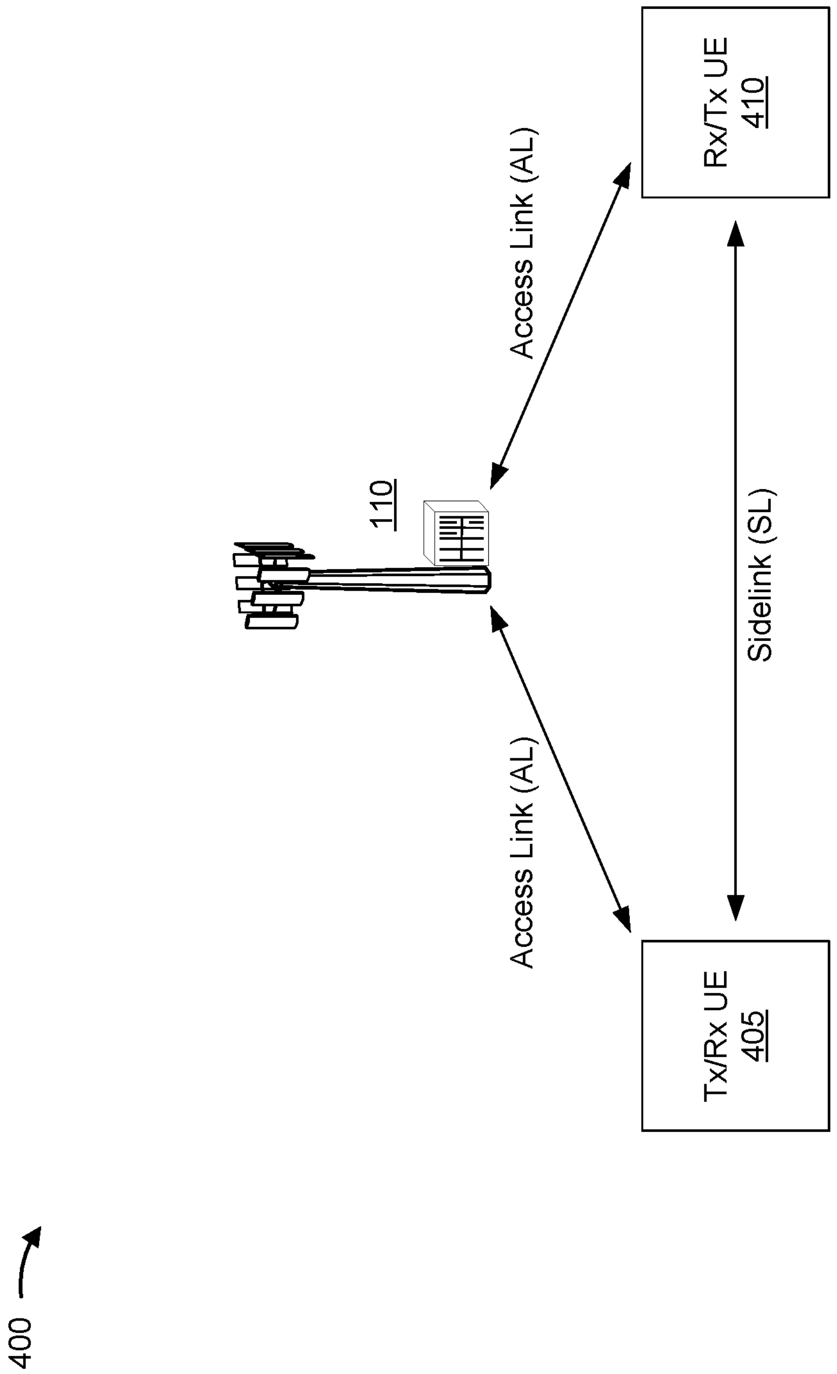
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, “sidelink” may refer to a direct link between UEs 120, and “access link” may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
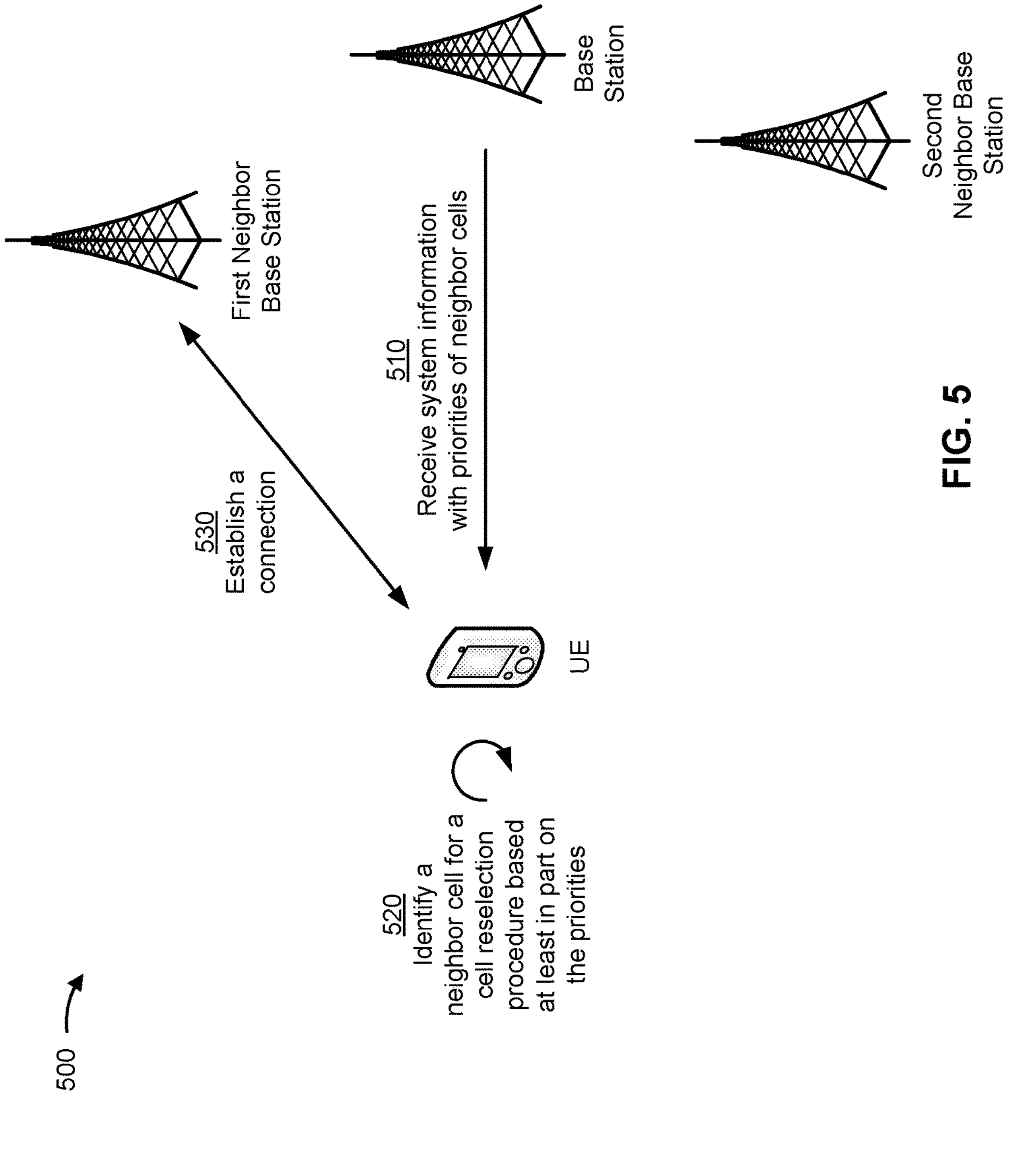
FIG. 5 is a diagram illustrating an example of a cell reselection process, in accordance with various aspects of the present disclosure.

FIG. 5 is a diagram illustrating an example of a cell reselection process, in accordance with various aspects of the present disclosure. As shown in FIG. 5, a UE and a base station may communicate via a cell of a wireless network. The wireless network may include a first neighbor cell that is provided by a first neighbor base station and a second neighbor cell that is provided by a second neighbor base station. The UE may determine to perform a cell reselection process (e.g., based at least in part on movement of the UE, a degradation of a wireless connection with the base station, and/or the like). To determine which neighbor cell is a preferred neighbor cell to select for the cell reselection process, the UE may rely upon information provided by the base station, the neighbor base stations, and/or the like.

As shown by reference number 510, the UE may receive system information with priorities of neighbor cells. The system information may indicate which of the neighbor base stations (e.g., that provide neighbor cells) have received signals from the UE. The priorities of the neighbor cells may be based at least in part on a network configuration, reference signal receive power (RSRP) of reference signals, and/or the like.

As shown by reference number 520, the UE may identify a neighbor cell for a cell reselection procedure based at least in part on the priorities indicated in the system information, RSRP values associated with the neighbor cells, and/or the like.

As shown by reference number 530, the UE may establish a connection with the first neighbor base station (e.g., providing a first neighbor cell). The UE may establish the connection based at least in part on the first neighbor cell having a highest priority in the system information and an RSRP value that satisfies a threshold.

As indicated above, FIG. 5 is provided as an example. Other examples may differ from what is described with respect to FIG. 5.

In some wireless networks, a UE may intend to use a service (e.g., a V2X service) after performing cell reselection. However, if a neighbor cell with a highest priority, as indicated in system information, does not support the service, the UE may select the neighbor cell and may be prohibited from using the service. Once the UE has selected the neighbor cell that does not support the service, the UE may consume computing, network, and/or communication resources to recover from failed attempts for communications (e.g., interruption of an ongoing communication), to perform an additional reselection process to attempt to find another cell that does support the service, and/or the like.

In some aspects described herein, a UE may be configured to perform a cell reselection process based at least in part on indications that identify neighbor cells that support a service (e.g., a V2X service, a multi-access edge computing (MEC) service, communication over an unlicensed band or a shared band, resource (e.g., power, computing, communication, and/or the like resources) saving services, and/or the like). A base station may transmit an indication that identifies one or more neighbor cells that support the service. For example, the base station may include information for only neighbor cells that support the service or may include information for additional neighbor cells and may indicate which neighbor cells support the service. The UE may perform the cell reselection process based at least in part on the indication that identifies the one or more neighbor cells that support the service. In this way, the UE may be configured to prioritize neighbor cells, for a reselection process, that support the service. Based at least in part on prioritizing neighbor cells that support the service, the UE and one or more base stations may conserve computing, network, and/or communication resources that may otherwise have been used to recover from failed attempts for using the service, to perform an additional reselection process to attempt to find another cell that does support the service, and/or the like. In some aspects, the UE and the one or more base stations may conserve computing, network, and/or communication resources that may otherwise have been used to recover from failed attempts for V2X communications (e.g., interruption of an ongoing V2X communication), to perform an additional reselection process to attempt to find another cell that does support, and/or the like. Although the following discussion describes the service as a V2X service, other types of services are within the scope of this disclosure.

Figure 6:
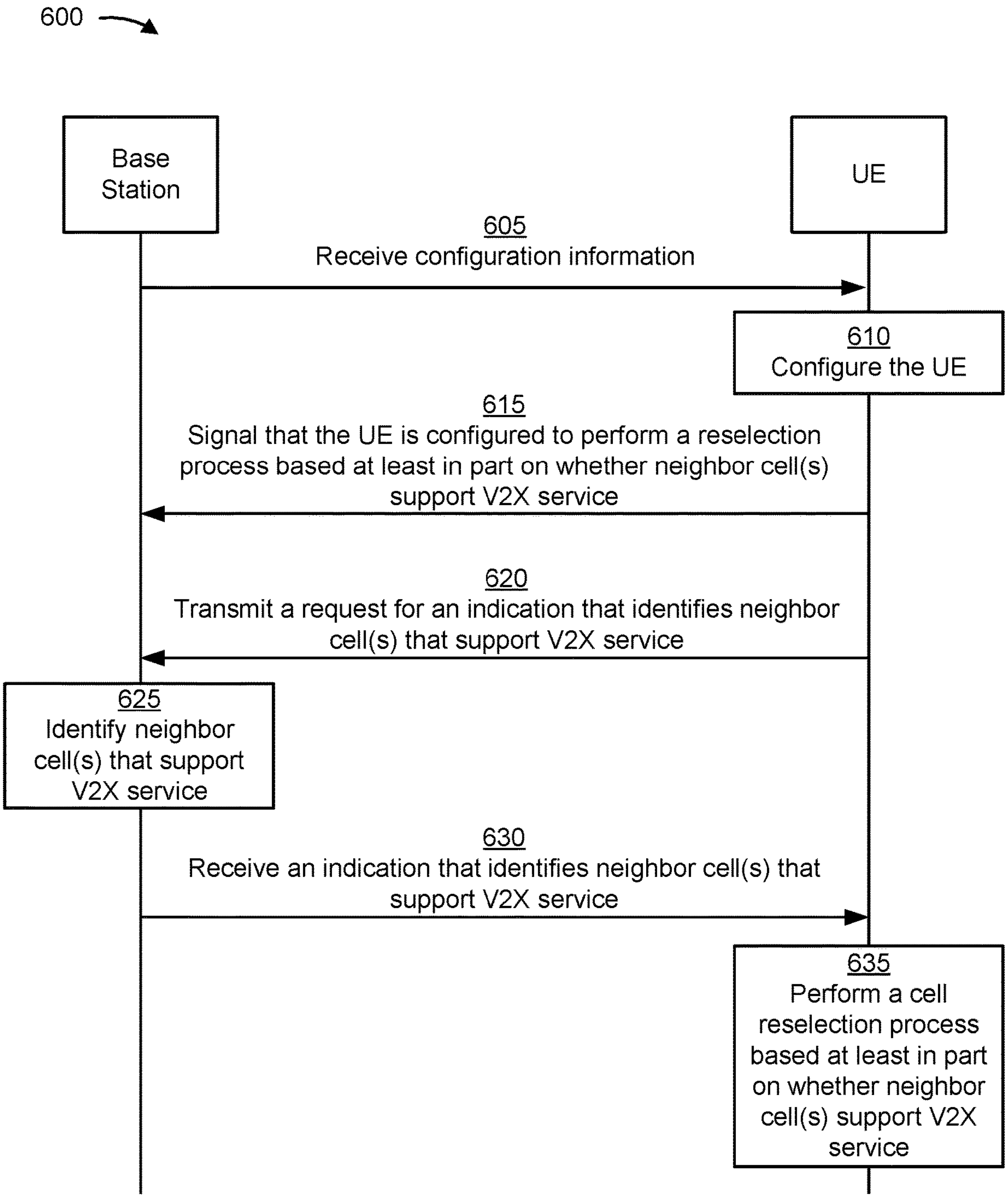
FIG. 6 is a diagram illustrating an example of reselection evaluation based at least in part on vehicle-to-anything support, in accordance with various aspects of the present disclosure.

FIG. 6 is a diagram illustrating an example 600 of a cell reselection process, in accordance with various aspects of the present disclosure. As shown in FIG. 6, a UE (e.g., UE 120) may communicate with a base station (e.g., base station 110). In some aspects, the UE and the base station may be part of a wireless network (e.g., wireless network 100). In some aspects, the base station may support a V2X service (e.g., by actively scheduling V2X communications, by reserving a frequency bandwidth for unscheduled V2X communications, and/or the like).

As shown by reference number 605, the UE may receive configuration information (e.g., from the base station, another base station, and/or the like). In some aspects, the UE may receive the configuration information via one or more of radio resource control (RRC) signaling, medium access control control elements (MAC CEs), and/or the like. In some aspects, the configuration information may indicate that a base station is to provide an indication (e.g., as part of a reselection process) that identifies one or more neighbor cells that support a V2X service. In some aspects, the configuration information may indicate that the UE may perform a reselection process based at least in part on the indication that identifies the one or more neighbor cells that support the V2X service. In some aspects, the configuration information may indicate that the base station is to provide the indication that the one or more neighbor cells support the V2X service. In some aspects, the base station may be configured to provide the indication based at least in part on a request for the indication, an indication that the UE is to perform a reselection process, and/or the like.

As shown by reference number 610, the UE may configure the UE for communicating with the base station. In some aspects, the UE may configure the UE based at least in part on the configuration information. In some aspects, the UE may be configured to perform a reselection process based at least in part on the indication that identifies the one or more neighbor cells that support the V2X service. In some aspects, the UE may be configured to perform one or more operations described herein.

As shown by reference number 615, the UE may signal that the UE is configured to perform the reselection process based at least in part on an indication that identifies the one or more neighbor cells that support the V2X service. For example, the UE may indicate that the UE is configured to use, for cell reselection, an indication that identifies the one or more neighbor cells that support the V2X service.

As shown by reference number 620, the UE may transmit a request for an indication that identifies the one or more neighbor cells that support the V2X service. In some aspects, the UE may transmit the request as part of a reselection process. In some aspects, the UE may transmit the request via a physical uplink control channel, a MAC CE, and/or the like.

As shown by reference number 625, the base station may identify one or more neighbor cells that support the V2X service. In some aspects, the base station may identify the one or more neighbor cells based at least in part on receiving system information from the one or more neighbor cells. The system information from the one or more neighbor cells may include one or more indications that the one or more neighbor cells support the V2X service. In some aspects, the system information may indicate which V2X services are supported by the one or more neighbor cells, one or more frequency bandwidths that are supported for the V2X services, and/or the like.

As shown by reference number 630, the UE may receive an indication that identifies one or more neighbor cells (e.g., of a set of neighbor cells) that support the V2X service. In some aspects, the base station may broadcast the indication within a system information block. The system information may also include priorities of the set of neighbor cells, priorities of the one or more neighbor cells, and/or the like. In some aspects, the base station may transmit the indication via one or more dynamic downlink transmissions (e.g., a downlink control information message), one or more MAC CEs, RRC signaling, and/or the like.

In some aspects, the indication may identify the one or more neighbor cells as supporting communication via a frequency band that supports the V2X service. The one or more neighbor cells may support the communication via the frequency band by actively scheduling V2X communications on the frequency bandwidth, reserving the frequency bandwidth for unscheduled V2X communications, and/or the like.

As shown by reference number 635, the UE may perform a cell reselection process based at least in part on whether the one or more neighbor cells support the V2X service. In some aspects, the UE may determine whether the UE intends to use the V2X service. For example, the UE may determine that the UE intends to use the V2X service based at least in part on the UE having an active V2X status (e.g., the UE has buffered data for V2X communications, has ongoing and/or scheduled transmissions or receptions for V2X communications, and/or the like).

In some aspects, the UE may select a cell of the one or more neighbor cells based at least in part on the UE intending to use the V2X service. Additionally, or alternatively, the UE may select the cell based at least in part on an RSRP of a reference signal associated with the cell. In some aspects, the UE may determine to ignore the indication based at least in part on the UE determining that the UE does not intend to use the V2X service.

In some aspects, the UE may determine to select the cell from the one or more neighbor cells that support the V2X service (e.g., the UE may exclude neighbor cells that do not support the V2X service). In some aspects, the UE may increase priorities of neighbor cells that support the V2X service (e.g., and lower priorities but not exclude neighbor cells that do not support the V2X service).

In some aspects, the UE may read the indication from system information to determine which neighbor cells are configured to support the V2X service. In some aspects, the UE may determine whether the UE has an active V2X status (e.g., before or as part of the cell reselection process) to determine whether the UE is to consider support for the V2X status in making the cell reselection. In some aspects, if the UE is capable of V2X service continuity and is receiving or scheduled to receive a V2X service-based communication, the UE may consider V2X support in the reselection process. In some aspects, the UE may consider V2X support in the reselection process based at least in part on an upcoming, scheduled, and/or expected V2X service-based communication being available only if the UE can receive the V2X service-based communication while the UE camps on a frequency on which the V2X service-based communication is provided, is scheduled, and/or expected to be provided. In some aspects, the UE may select the cell based at least in part on the UE being capable of V2X service continuity and on the cell broadcasting system information (e.g., a system information block).

Based at least in part on the base station providing the indication of which neighbor cells support the V2X service, the UE may prioritize neighbor cells based at least in part on whether the neighbor cells support the V2X service. In this way, the UE can make an informed decision for cell reselection based at least in part on whether the UE intends to use the V2X service and whether neighbor cells support the V2X service. This conserves computing, network, and/or communication resources that may otherwise have been used to recover from failed attempts for V2X communications (e.g., interruption of an ongoing V2X communication), to perform an additional reselection process to attempt to find another cell that does support the V2X service, and/or the like.

As indicated above, FIG. 6 is provided as an example. Other examples may differ from what is described with respect to FIG. 6.

Figure 7:
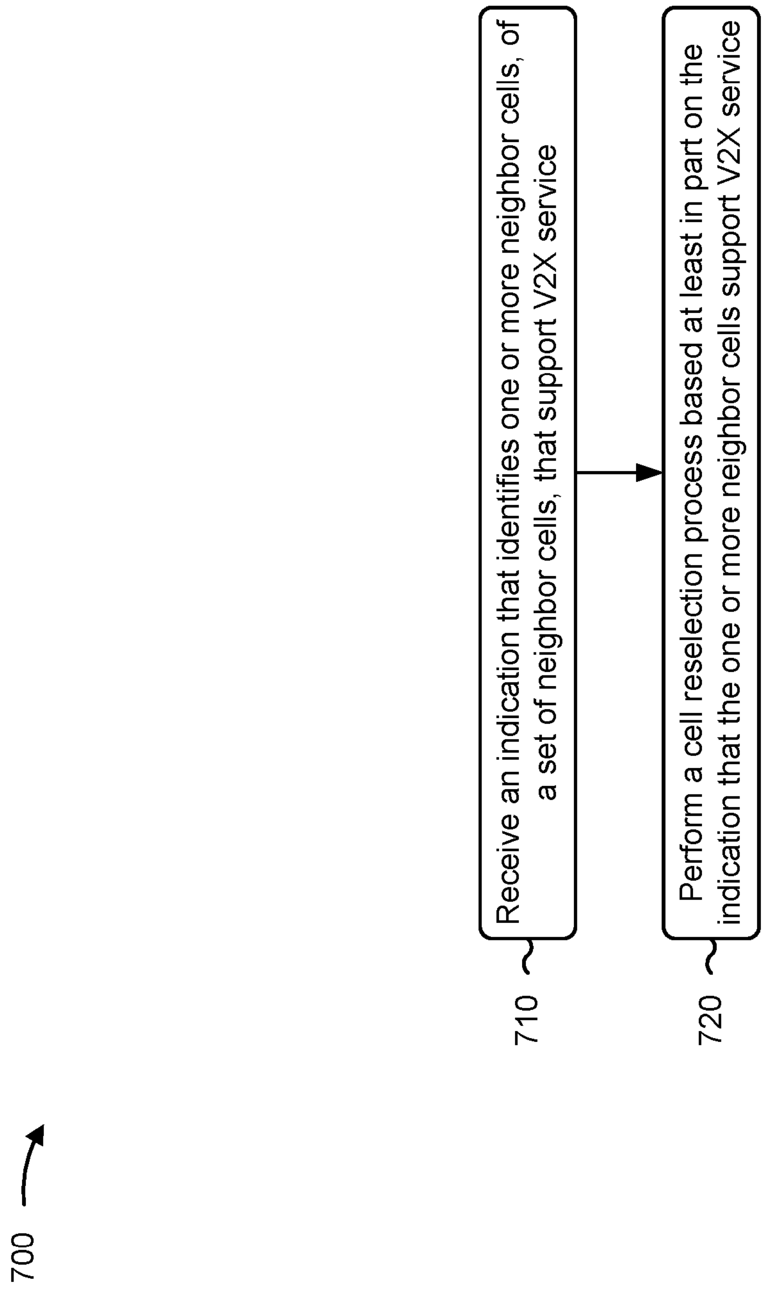
FIG. 7 is a diagram illustrating an example process performed, for example, by a user equipment, in accordance with various aspects of the present disclosure.

FIG. 7 is a diagram illustrating an example process 700 performed, for example, by a UE, in accordance with various aspects of the present disclosure. Example process 700 is an example where the UE (e.g., UE 120 and/or the like) performs operations associated with reselection based at least in part on V2X support.

As shown in FIG. 7, in some aspects, process 700 may include receiving an indication that identifies one or more neighbor cells, of a set of neighbor cells, that support a V2X service (block 710). For example, the UE (e.g., using receive processor 258, controller/processor 280, memory 282, and/or the like) may receive an indication that identifies one or more neighbor cells, of a set of neighbor cells, that support a V2X service, as described above.

As further shown in FIG. 7, in some aspects, process 700 may include performing a cell reselection process based at least in part on the indication that the one or more neighbor cells support the V2X service (block 720). For example, the UE (e.g., using receive processor 258, transmit processor 264, controller/processor 280, memory 282, and/or the like) may perform a cell reselection process based at least in part on the indication that the one or more neighbor cells support the V2X service, as described above.

Process 700 may include additional aspects, such as any single aspect or any combination of aspects described below and/or in connection with one or more other processes described elsewhere herein.

In a first aspect, the indication identifies the one or more neighbor cells as supporting communication via a frequency bandwidth that supports the V2X service.

In a second aspect, alone or in combination with the first aspect, receiving the indication includes receiving the indication within a system information block.

In a third aspect, alone or in combination with one or more of the first and second aspects, performing the reselection process includes determining whether the UE intends to use the V2X service, and selecting a neighbor cell of the set of neighbor cells based at least in part on whether the UE intends to use the V2X service.

In a fourth aspect, alone or in combination with one or more of the first through third aspects, determining whether the UE intends to use the V2X service includes determining whether the UE has an active V2X status.

In a fifth aspect, alone or in combination with one or more of the first through fourth aspects, performing the reselection process includes selecting a cell of the one or more neighbor cells based at least in part on the UE intending to use the V2X service and on a received power of a reference signal associated with the cell.

In a sixth aspect, alone or in combination with one or more of the first through fifth aspects, process 700 includes receiving configuration information that indicates that a base station is to provide the indication that the one or more neighbor cells support the V2X service.

In a seventh aspect, alone or in combination with one or more of the first through sixth aspects, process 700 includes transmitting a request for the indication, wherein receiving the indication is based at least in part on transmitting the request for the indication.

In an eighth aspect, alone or in combination with one or more of the first through seventh aspects, process 700 includes signaling that the UE is configured to perform the reselection process based at least in part on the indication, wherein receiving the indication is based at least in part on the signaling.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
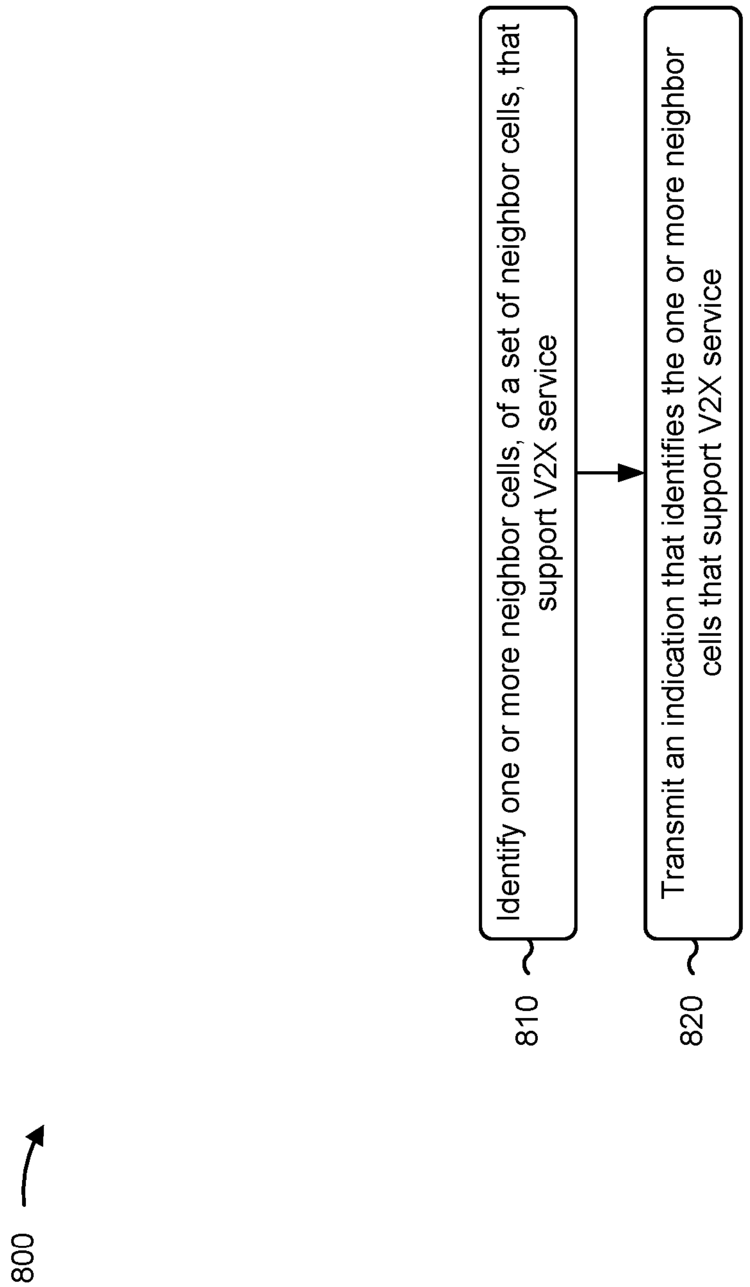
FIG. 8 is a diagram illustrating an example process performed, for example, by a base station, in accordance with various aspects of the present disclosure.

FIG. 8 is a diagram illustrating an example process 800 performed, for example, by a base station, in accordance with various aspects of the present disclosure. Example process 800 is an example where the base station (e.g., base station 110 and/or the like) performs operations associated with reselection based at least in part on V2X support.

As shown in FIG. 8, in some aspects, process 800 may include identifying one or more neighbor cells, of a set of neighbor cells, that support a V2X service (block 810). For example, the base station (e.g., using transmit processor 220, receive processor 238, controller/processor 240, memory 242, and/or the like) may identify one or more neighbor cells, of a set of neighbor cells, that support a V2X service, as described above.

As further shown in FIG. 8, in some aspects, process 800 may include transmitting an indication that identifies the one or more neighbor cells that support the V2X service (block

820). For example, the base station (e.g., using transmit processor 220, controller/processor 240, memory 242, and/or the like) may transmit an indication that identifies the one or more neighbor cells that support the V2X service, as described above.

Process 800 may include additional aspects, such as any single aspect or any combination of aspects described below and/or in connection with one or more other processes described elsewhere herein.

In a first aspect, the indication identifies the one or more neighbor cells as supporting communication via a frequency bandwidth that supports the V2X service.

In a second aspect, alone or in combination with the first aspect, transmitting the indication includes broadcasting the indication within a system information block.

In a third aspect, alone or in combination with one or more of the first and second aspects, identifying the one or more neighbor cells that support the V2X service includes receiving system information from the one or more neighbor cells, and the system information includes one or more indications that the one or more neighbor cells support the V2X service.

In a fourth aspect, alone or in combination with one or more of the first through third aspects, process 800 includes transmitting configuration information that indicates that the base station is to provide the indication that the one or more neighbor cells support the V2X service.

In a fifth aspect, alone or in combination with one or more of the first through fourth aspects, process 800 includes receiving a request for the indication, wherein transmitting the indication is based at least in part on receiving the request for the indication.

In a sixth aspect, alone or in combination with one or more of the first through fifth aspects, process 800 includes receiving signaling that a UE is configured to perform a reselection process based at least in part on the indication, wherein transmitting the indication is based at least in part on the signaling.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
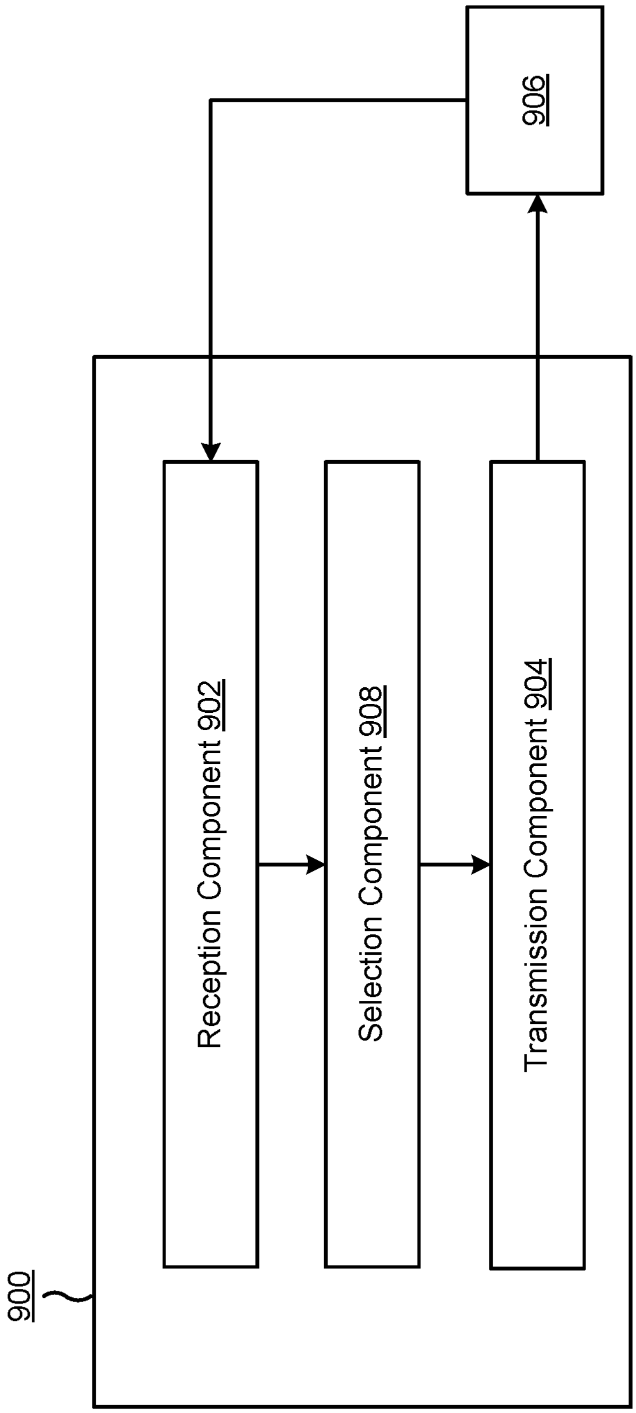
FIGS. 9-10 are block diagrams of example apparatuses for wireless communication.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 906 may include a selection component 908, among other example components.

In some aspects, the apparatus 900 may be configured to perform one or more operations described herein in connection with FIGS. 3-9. Additionally or alternatively, the apparatus 900 may be configured to perform one or more processes described herein, such as process 700 of FIG. 7. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be collocated with the reception component 902 in a transceiver.

The reception component 902 may receive an indication that identifies one or more neighbor cells, of a set of neighbor cells, that support a service, such as V2X service. The selection component 908 may perform a cell reselection process based at least in part on the indication that the one or more neighbor cells support the V2X service. The transmission component 904 may transmit communications associated with requesting the indication, performing the reselection, and/or the like.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

Figure 10:
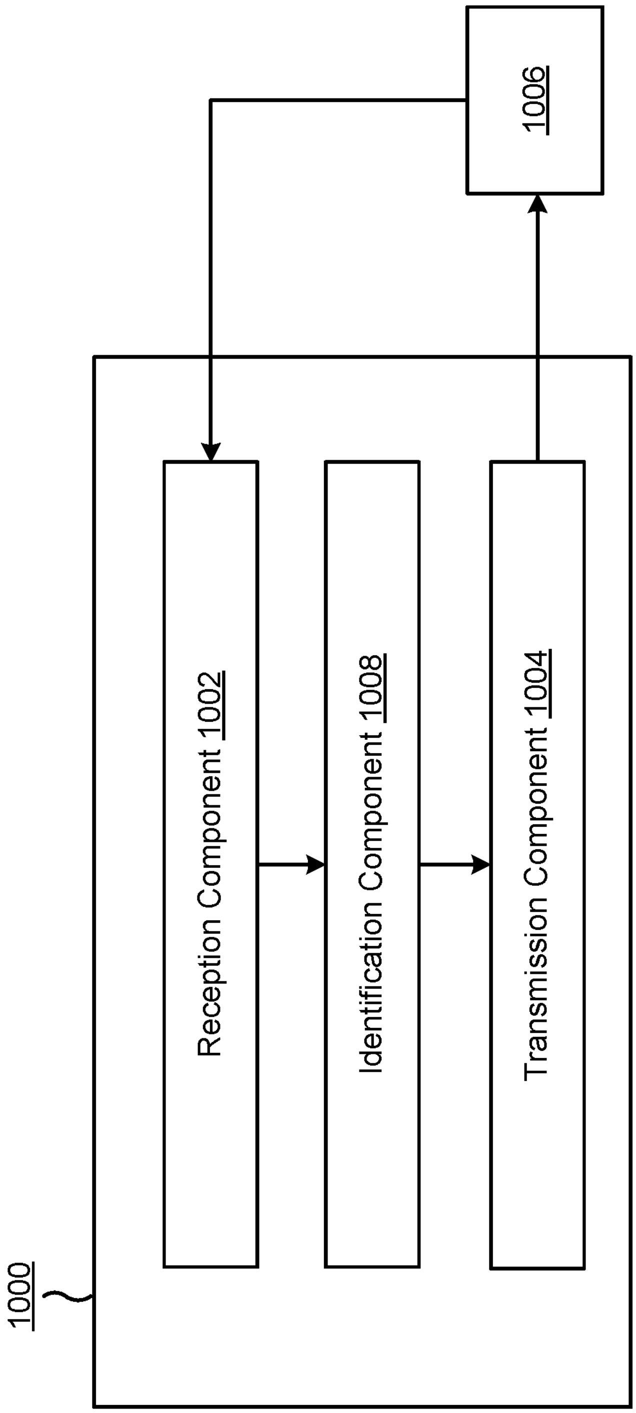

FIG. 10 is a block diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1006 may include an identification selection component 1008, among other example components.

In some aspects, the apparatus 1000 may be configured to perform one or more operations described herein in connection with FIGS. 3-9. Additionally or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described above in connection with FIG. 2. Additionally, or alternatively, one or more components shown in FIG. 10 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the base station described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the base station described above in connection with FIG. 2. In some aspects, the transmission component 1004 may be collocated with the reception component 1002 in a transceiver.

The reception component 1002 may receive a request for an indication that identifies one or more neighbor cells, of a set of neighbor cells, that support a service, such as V2X service. In some aspects, the reception component 1002 may receive a transmission that indicates (e.g., via a signal strength, a mobility measurement, and/or the like), the a device (e.g., UE 120) may attempt a cell reselection procedure. The identification component 1008 may identify one or more neighbor cells, of a set of neighbor cells, that support the service. The transmission component 1004 may transmit the indication that identifies the one or more neighbor cells that support the service.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, comprising:

receiving an indication that identifies a plurality of neighbor cells that support a vehicle to anything (V2X) service; and performing a cell reselection process in accordance with the indication that the plurality of neighbor cells support the V2X service and whether a user equipment (UE) intends to use the V2X service;

wherein the plurality of neighbor cells actively schedule V2X communications on a frequency bandwidth that supports the V2X service or reserve the frequency bandwidth for unscheduled V2X communications, wherein performing the cell reselection process includes: selecting a neighbor cell of the plurality of neighbor cells based at least in part on the UE intending to use the V2X service, or ignoring the indication based at least in part on the UE not intending to use the V2X service, and wherein the cell reselection process is further based at least in part on a scheduled or expected V2X service-based communication that is associated with a frequency on which the V2X service-based communication is scheduled or expected to be provided.

2. The method of claim 1, wherein the indication identifies the plurality of neighbor cells as supporting communication via the frequency bandwidth that supports the V2X service.

3. The method of claim 1, wherein receiving the indication comprises:

receiving the indication within a system information block.

4. The method of claim 1, wherein selecting the neighbor cell comprises:

determining whether the UE has an active V2X status.

5. The method of claim 1, wherein performing the cell reselection process comprises:

selecting a cell of the plurality of neighbor cells based at least in part on the UE intending to use the V2X service and a received power of a reference signal associated with the cell.

6. The method of claim 1, further comprising:

receiving configuration information that indicates that a base station is to provide the indication that the plurality of neighbor cells support the V2X service.

7. The method of claim 1, further comprising:

transmitting a request for the indication, the receiving of the indication being responsive to transmitting the request for the indication.

8. The method of claim 1, further comprising:

signaling that the UE is configured to perform the cell reselection process in accordance with the indication, the receiving of the indication being responsive to the signaling.

9. The method of claim 1, further comprising:

configuring the UE to perform the cell reselection process in accordance with configuration information indicating that a base station is to provide the indication in association with the cell reselection process.

10. The method of claim 1, wherein the V2X service corresponds to communication over an unlicensed band or a shared band.

11. A method of wireless communication, comprising:

identifying a plurality of neighbor cells that support a vehicle to anything (V2X) service; and transmitting an indication that identifies the plurality of neighbor cells that support the V2X service, the indication enabling a user equipment (UE) to perform a cell reselection process in accordance with the indication and whether the UE intends to use the V2X service;

wherein the plurality of neighbor cells actively schedule V2X communications on a frequency bandwidth that supports the V2X service or reserve the frequency bandwidth for unscheduled V2X communications, wherein performing the cell reselection process includes selecting a neighbor cell, of the plurality of neighbor cells, based at least in part on the UE intending to use the V2X service, or ignoring the indication based at least in part on the UE not intending to use the V2X service, and wherein the cell reselection process is further based at least in part on a scheduled or expected V2X service-based communication that is associated with a frequency on which the V2X service-based communication is scheduled or expected to be provided.

12. The method of claim 11, wherein the indication identifies the plurality of neighbor cells as supporting communication via the frequency bandwidth that supports the V2X service.

13. The method of claim 11, wherein transmitting the indication comprises:

broadcasting the indication within a system information block.

14. The method of claim 11, wherein identifying the plurality of neighbor cells that support the V2X service comprises:

receiving system information from the plurality of neighbor cells, the system information including one or more indications that the plurality of neighbor cells support the V2X service.

15. The method of claim 11, further comprising:

transmitting configuration information that indicates that a base station is to provide the indication that the plurality of neighbor cells support the V2X service.

16. The method of claim 11, further comprising:

receiving a request for the indication, the transmitting of the indication being responsive to receiving the request for the indication.

17. An apparatus for wireless communication at a user equipment (UE), comprising:

one or more memories storing processor-executable code; and one or more processors coupled with the one or more memories, at least one processor of the one or more processors configured to cause the apparatus to:

receive an indication that identifies a plurality of neighbor cells that support a vehicle to anything (V2X) service; and perform a cell reselection process in accordance with the indication that the plurality of neighbor cells support the V2X service and whether the UE intends to use the V2X service;

wherein the plurality of neighbor cells actively schedule V2X communications on a frequency bandwidth that supports the V2X service or reserve the frequency bandwidth for unscheduled V2X communications, wherein performing the cell reselection process includes: selecting a neighbor cell of the plurality of neighbor cells based at least in part on the UE intending to use the V2X service, or ignoring the indication based at least in part on the UE not intending to use the V2X service, and wherein the cell reselection process is further based at least in part on a scheduled or expected V2X service-based communication that is associated with a frequency on which the V2X service-based communication is scheduled or expected to be provided.

18. The apparatus of claim 17, wherein the indication identifies the plurality of neighbor cells as supporting communication via the frequency bandwidth that supports the V2X service.

19. The apparatus of claim 17, wherein reception of the indication comprises:

reception of the indication within a system information block.

20. The apparatus of claim 17, wherein the selecting of the neighbor cell comprises:

a determination of whether the UE has an active status.

21. The apparatus of claim 17, wherein the cell reselection process comprises:

selection of a cell of the plurality of neighbor cells in accordance with the UE intending to use the V2X service and a received power of a reference signal associated with the cell.

22. The apparatus of claim 17, wherein the at least one processor is further configured to cause the apparatus to:

receive configuration information that indicates that a base station is to provide the indication that the plurality of neighbor cells support the V2X service.

23. The apparatus of claim 17, wherein the at least one processor is further configured to cause the apparatus to:

signal that the UE is configured to perform the cell reselection process in accordance with the indication, the reception of the indication being responsive to the signaling.

24. The apparatus of claim 17, wherein the V2X service corresponds to communication over an unlicensed band or a shared band.

25. The apparatus of claim 17, wherein the at least one processor is further configured to cause the apparatus to:

transmit a request for the indication, the receiving of the indication being responsive to transmitting the request for the indication.

26. An apparatus for wireless communication at a base station, comprising:

one or more memories storing processor-executable code; and one or more processors coupled with the one or more memories, at least one processor of the one or more processors configured to cause the apparatus to:

identify a plurality of neighbor cells that support a vehicle to anything (V2X) service; and transmit an indication that identifies the plurality of neighbor cells that support the V2X service, and by which a cell reselection process is able to be performed by a user equipment UE in accordance with the indication and whether the UE intends to use the V2X service;

wherein the plurality of neighbor cells actively schedule V2X communications on a frequency bandwidth that supports the V2X service or reserve the frequency bandwidth for unscheduled V2X communications, wherein performing the cell reselection process includes; selecting a neighbor cell of the plurality of neighbor cells based at least in part on the UE intending to use the V2X service, or ignoring the indication based at least in part on the UE not intending to use the V2X service, and wherein the cell reselection process is further based at least in part on a scheduled or expected V2X service-based communication that is associated with a frequency on which the V2X service-based communication is scheduled or expected to be provided.

27. The apparatus of claim 26, wherein transmission of the indication comprises:

a broadcast of the indication within a system information block.

28. The apparatus of claim 26, wherein identification of the plurality of neighbor cells that support the V2X service comprises:

reception of system information from the plurality of neighbor cells, the system information including one or more indications that the plurality of neighbor cells support the V2X service.

29. The apparatus of claim 26, wherein the at least one processor is further configured to cause the apparatus to:

transmit configuration information that indicates that the base station is to provide the indication that the plurality of neighbor cells support the V2X service.

30. The apparatus of claim 26, wherein the at least one processor is further configured to cause the apparatus to:

receive signaling that a user equipment is configured to perform a reselection process in accordance with the indication, the transmitting of the indication being responsive to the signaling.

* * * * *